(12) United States Patent
Muraki et al.

(10) Patent No.: US 8,312,109 B2
(45) Date of Patent: *Nov. 13, 2012

(54) CONTENT MANIPULATION USING HIERARCHICAL ADDRESS TRANSLATIONS ACROSS A NETWORK

(75) Inventors: Izumi Muraki, Tokyo (JP); Shuyo Nakatani, Tokyo (JP); Ryoichi Ichiyama, Tokyo (JP)

(73) Assignee: Kanata Limited, Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 10/558,101

(22) PCT Filed: Mar. 11, 2005

(86) PCT No.: PCT/JP2005/004372
§ 371 (c)(1),
(2), (4) Date: Dec. 8, 2006

(87) PCT Pub. No.: WO2005/088469
PCT Pub. Date: Sep. 22, 2005

(65) Prior Publication Data
US 2007/0067492 A1 Mar. 22, 2007

(30) Foreign Application Priority Data
Mar. 12, 2004 (JP) .................................. 2004-071389

(51) Int. Cl.
*G06F 15/16* (2006.01)
(52) U.S. Cl. .................... 709/219; 709/203; 707/782
(58) Field of Classification Search .................. 709/203, 709/218, 219, 228; 707/4, 3, 781, 782, 797
See application file for complete search history.

(56) References Cited

U.S. PATENT DOCUMENTS

| 4,769,772 A * | 9/1988 | Dwyer ........................... 707/714 |
| 6,253,254 B1 | 6/2001 | Erlenkoetter et al. |

(Continued)

FOREIGN PATENT DOCUMENTS

| JP | 10143423 | 5/1998 |

(Continued)

OTHER PUBLICATIONS

Meier, Wolfgang; "eXist: An Open Source Native XML Database"; 2002; Web-Services, and Database Systems, NODe 2002 Web and Database-Related Workshops; Springer; pp. 1-16.*

(Continued)

*Primary Examiner* — Jeffrey Nickerson
(74) *Attorney, Agent, or Firm* — Cermak Nakajima LLP; Tomoko Nakajima

(57) ABSTRACT

In an information processing method, objects are given unique labels expressed by a tree structure by a plurality of nodes. The label includes (A) name information showing node names from a highest order node to a lowest order node and (B) a storing position of the object. Each node corresponds to data required for a process or a software application. Information expressed in an external language is transmitted and received to and from devices in a network. A received label expressing an object is processed such that a process of calling-up, writing, deletion, and partial change with respect to each node of the object is performed. At least one node of the object is acquired via the network expressed in the external language together with a request for processing. The designated object is converted into information expressed in an internal language while preserving the acquired node tree structure.

6 Claims, 12 Drawing Sheets

| NODE | IDENTIFIER | DATA |
|---|---|---|
| FOR EXAMPLE, "http://gameA" IN THE URI | / | |
| | /items | |
| | /items/lamp | LAMP |
| | /user | |
| | /user/taro | |
| | /user/taro/lamp | /items/lamp |
| | /user/taro/lamp/fuel | 25 |

U.S. PATENT DOCUMENTS

| | | | |
|---|---|---|---|
| 6,408,298 B1* | 6/2002 | Van et al. | 707/10 |
| 6,763,347 B1 | 7/2004 | Zhang | |
| 6,767,284 B1 | 7/2004 | Koza | |
| 6,948,072 B2 | 9/2005 | Hatakeyama et al. | |
| 7,032,118 B2 | 4/2006 | Hirezaki et al. | |
| 2001/0029522 A1 | 10/2001 | Yoshimine et al. | |
| 2002/0029259 A1 | 3/2002 | Okada | |
| 2002/0144152 A1 | 10/2002 | Ikeda | |
| 2002/0156772 A1* | 10/2002 | Chau et al. | 707/3 |
| 2002/0199014 A1* | 12/2002 | Yang et al. | 709/238 |
| 2003/0029911 A1 | 2/2003 | Kitayama | |
| 2003/0041094 A1* | 2/2003 | Lara et al. | 709/201 |
| 2003/0182422 A1 | 9/2003 | Bradshaw et al. | |
| 2004/0039964 A1* | 2/2004 | Russell et al. | 714/25 |
| 2004/0064475 A1 | 4/2004 | Maeda et al. | |
| 2004/0133581 A1 | 7/2004 | Shinjo | |
| 2004/0225722 A1 | 11/2004 | Jeong | |
| 2005/0055355 A1 | 3/2005 | Murthy et al. | |
| 2005/0060332 A1 | 3/2005 | Bernstein et al. | |
| 2005/0131906 A1 | 6/2005 | Shin | |
| 2005/0132266 A1* | 6/2005 | Ambrosino et al. | 715/500.1 |
| 2005/0154708 A1 | 7/2005 | Sun | |
| 2005/0187912 A1 | 8/2005 | Matsa et al. | |
| 2005/0192932 A1 | 9/2005 | Kazar et al. | |
| 2005/0228809 A1 | 10/2005 | Asano et al. | |
| 2005/0234978 A1 | 10/2005 | Minamino et al. | |
| 2005/0240591 A1 | 10/2005 | Marceau et al. | |
| 2006/0015629 A1 | 1/2006 | Mori et al. | |
| 2006/0045084 A1 | 3/2006 | Matsuda et al. | |
| 2006/0068919 A1 | 3/2006 | Gottfurcht | |
| 2006/0092861 A1 | 5/2006 | Corday et al. | |
| 2006/0095543 A1 | 5/2006 | Ito et al. | |
| 2006/0178216 A1 | 8/2006 | Shea et al. | |
| 2009/0300472 A1* | 12/2009 | Ambrosino et al. | 715/201 |

FOREIGN PATENT DOCUMENTS

| | | |
|---|---|---|
| JP | 2001147812 | 5/2001 |
| JP | 2001-312581 | 11/2001 |
| JP | 2001-312581 A | 11/2001 |
| JP | 2005196801 | 2/2005 |

OTHER PUBLICATIONS

Clark et al; "Protecting Free Expression Online with Freenet"; Feb. 2002; IEEE Internet Computing; pp. 40-49.*

Hudson, Greg; "ColdMUD Programmers Reference"; 1994; v 0.10 revision 1; pp. 1-58; retrieved at http://web.mit.edu/afs/sipb/project/coldmud/doc/coldmud.html on Sep. 10, 2010.*

Zope; "Introduction to Zope 2.6: The New Zope Zoo"; Aug. 5, 2003; Zope.org; pp. 1-16; retrieved from http://old.zope.org/Members/jwhitener/zopeZoo_2_6 on Jun. 29, 2012.*

Noborio, H., Construction of the Octree Approximating Three-Dimensional Objects by Using Multiple Views, IEEE Transaction on Pattern Analysis and Machine Intelligence, vol. 10, No. 6, Nov. 1988.

Christodoulakis et al., "The Kydonia Multimedia Information Server," Multimedia Applications, Services and Techniques—ECMAST '97, Lecture Notes in Computer Science, vol. 1242†1997, pp. 491-506 (1997).

"About Native XML Databases", www.mediafusion-usa.com/faq.html, Media Fusion Co., Ltd (Feb. 10, 2004).

Cunningham et al., "Applying Software Patterns in the Design of a Table Framework," Acxiom Data Engineering Lab (ADEL) Working Paper Series 2002, Axciom Laboratory for Applied Research, Publication in Collaboration with UALR—Donaghey Cyber College (2002).

Lee et al., "An Integrated Approach to Version Control Management in Computer Supported Collaborative Writing," ACM-SE 36 Proceedings of the 36th Annual Southeast Regional Conference, ACM, New York, NY (1998).

Kriegel et al., "Efficient Query Processing on Relational Data-Partitioning Index Structures," 16th International Conference on Scientific and Statistical Database Managment (SSDBM '04), Santorini Island, Greece, p. 119 (Jun. 21-23, 2004).

Office Action from Japanese Patent App. No. 2009-096716 (Nov. 17, 2011) with partial English language translation.

Refusal from Japanese Patent App. No. 2009-096716 (Feb. 1, 2012) with partial English language translation.

"Chapter 3, Basic, Use of Zope Object", Japan, Nov. 21, 2001m URL: http://my.reset.jp/%Enogami/ZopeBook/ BasicObject-jp.html, with partial English language translation.

Michiharu Sakurai, "New-generation Web Application Development Environment, Zope, Part 1, What is Zope?; Part 2, In Zope", C Magazine, Japan, SoftBank Publishing Co. Ltd., Oct. 1, 2002, vol. 14, No. 10, pp. 40-69; p. 5, Fig. 3-1 is cited by the Japanese Office Action.

Certification of Translation for partial English language translations (Jun. 14, 2012).

* cited by examiner

F I G. 5

| NODE | IDENTIFIER | DATA |
|---|---|---|
| ● ← FOR EXAMPLE, "http://gameA" IN THE URI | / | |
| ● | /items | |
| ● ⊗ ⊗ ⋯ ⊗ | /items/lamp | LAMP |
| ● | /user | |
| ● | /user/taro | |
| ● | /user/taro/lamp | /items/lamp |
| ● | /user/taro/lamp/fuel | 25 |

FIG. 6

| NODE | IDENTIFIER |
|---|---|
| ● | / |
| ● | /price |
| ● | /weight |
| ● | /fuel |
| ● | /state |
| ● | /on |
| ● | /off |
| ● | /tick |

CONTENT MANIPULATION USING HIERARCHICAL ADDRESS TRANSLATIONS ACROSS A NETWORK

TECHNICAL FIELD

The present invention relates to an information processing device, system, method, and recording medium, and in particular, to an information processing device, system, method, and recording medium which are used in the development and employment of a network application, including an online game, and which transmit and receive information via a communication line such as the internet or the like.

BACKGROUND TECHNOLOGY

Accompanying the development of information communication infrastructures in recent years, it has become possible to, by using a computer as an information terminal, participate in a network such as the internet or the like and carry out bidirectional information transmission and reception. Attention is focused on systems which utilize the advantages of the network and provide various types of services. Among such systems, there is a server-client-type network system in which the relationship between a server computer and a client computer is established and on which date is sent and received (uploaded and downloaded or the like) of data or the like. Further, in recent years, peer-to-peer (so-called P2P) type network systems have been realized. A peer-to-peer type network system constructs a system which provides functions such that the respective plurality of computers which are connected to a network are in an equal relationship as peers, or constructs a system in which, further, any one computer has a function section which intensively manages some of the functions.

Various types of network applications are developed in order to execute applications in the above-described network systems. Attention is focused on online games as an example of such network applications. In an online game, due to users who are participating in the online game accessing, from the plural computers that they own, a computer which operates the online game which is the object, the plural users can participate in the online game. Further, there are applications which provide an online message board on a computer, and enable writing to the message board from the user computers. Moreover, there are also known applications which operate a WWW (World Wide Web) server and enable access from clients by a so-called WWW browser via a network.

In a network application system, in order to achieve operation in a common environment at one's own computer (e.g., a client computer or a Peer computer) which is connected to another computer (e.g., a server computer or a Peer computer), it is required that a common application, which is in accordance with common specifications of the network application system, be introduced into each computer.

For example, in an online game which is an example of a network application, various types of specifications are incorporated-in in advance in order to address diverse requirements of users, and the application is provided. Further, it is assumed that plural computers are connected to the computer which is being employed and operated, and there are many cases in which access limitations or usage limitations are set in advance.

FIG. 12 schematically shows the architecture of one computer in a network application system. The architecture of FIG. 12 is structured by the hardware of the computer and the software which operates the hardware. A computer 100 is constructed with its structure being a virtual machine 102 which controls the basic operation of the hardware without being influenced by the inherent specifications of each hardware or the operating system (OS). A library 104, which utilizes the virtual machine 102 and operates the computer 100, can be added to the structure of the virtual machine 102. An interface 106, which is for transmitting and receiving data between the virtual machine 102 and the library 104, is provided at both of the virtual machine 102 and the library 104.

A container 110, which is a resource for operating applications at the computer 100, is provided at the virtual machine 102. The container 110 includes a unit 112 for realizing protocol (e.g., HTTP) functions for communication with the exterior. The unit 112 is structured such that data transmission and reception in accordance with HTTP protocol are possible between the unit 112 and exterior devices. A library 114, which is for function expansion or the like of the container 110, can be added to the structure of the container 110. An interface 116, which is for transmission and reception of data between the container 110 and the library 114, is provided at both the container 110 and the library 114. Data 118 within the computer 100 can be accessed from the library 114.

Components 120, 130 can be disposed at the container 110. The component 120 has an application feature which transmits and receives data to and from exterior devices via the unit 112. Therefore, an interface 122 for transmission and reception of data between the container 110 and the component 120 is provided at both the container 110 and the component 120. Further, the component 120 has an interface 124 for transmission and reception of data to and from the virtual machine 102. The component 130 has, at the interior thereof, file data 134, and the file data 134 is structured in cooperation with an inherent library 136 at the component 130. An interface 132 is provided at the container 130 in order to use the internal file data 134 and the library 136.

As described above, the computer 100 requires inherent interfaces for the components and libraries and the like, at the time of adding a library which is feature addition or the like, or at the time of utilizing an application, and the computer 100 utilizes the components and libraries by using these interfaces.

DISCLOSURE OF THE INVENTION

Problems to be Solved by the Invention

However, in a network application, almost all of the information circulating on the network is, in the first place, data used in that application. In cases such as when additional value is added to the network application itself or the like, it is difficult to add or change features in real time at the server side. For example, at the client side, there are mechanisms which download additional features and automatically carry out the processing of installing the additional features. However, at the server side, there is no mechanism which automatically completes processing for constructing a service while the network application is being used. Further, when making changes such as the addition of a feature, the changing of specifications, the deletion of a feature or the like which accompany a change in service, the network application itself is affected. Therefore, at the server side, a specification change or a data structure change is requested, and at that time, stopping of the system and changing of the system are inevitable.

Further, the server business which provides the network application determines the specifications and the data structure, and constructs the services of the network application.

However, the specifications and data structure presuppose that the service business independently defines and controls them, and it is difficult for a third party other than the service business to construct related services. This is because, since the constructing or administering of a related service of a network application depends on the network application itself and the environment of execution, development and employment, which extract a region of at least a portion of a network application, are difficult.

Further, at a network application, because it is presupposed that there will be a high-load state due to access from a large number of computers, measures with respect to such high loads must be supposed in advance. However, it is difficult to predict what places of a network application will become high-load.

The present invention has been proposed in consideration of the above-described circumstances.

Means for Solving the Problems

A first aspect of the present invention is an information processing device which transmits and receives information to and from other devices via a network, including: storage means for storing a plurality of objects with respect to addresses, each object being given a unique address which is expressed by a hierarchical structure by a plurality of nodes, and in which object position information showing a position from a highest order node to its own node in the hierarchical structure by name information which expresses names of the respective nodes being continuous in accordance with the hierarchical structure is connected to identification information for identifying the present device in the network, and which expresses its own position; transmitting and receiving means for transmitting and receiving information expressed in external languages to and from other devices via the network, and successively processing a request for at least one processing of calling-up, writing, deletion, and partial change with respect to an object which is stored in the storage means and whose address is designated; and engine means including a first converting means which via the network acquires at least one object which is in accordance with external languages together with the request for processing and converts the acquired object into information expressed in internal languages while preserving a hierarchical structure of the acquired object as is, a control means interpreting the address of the requested object and carrying out the requested processing on the object whose address is interpreted, and a second converting means converting an object stored in the storage means into external languages while preserving a hierarchical structure of the object as is.

In accordance with the first aspect of the present invention, a plurality of objects, which are expressed by hierarchical structures by a plurality of nodes, are stored in the storage means. Each object is given a unique address which expresses its own position and in which object position information is connected to identification information for identifying the present device at a network. A protocol name and a domain name can be used as the identification information. Further, the object position information can express the position from the highest order node to its own node in the hierarchical structure, by name information, which show the names of the respective nodes, being continuous in accordance with the hierarchical structure. For example, in a case in which the hierarchical structure of the object is structured in the order of the type, such as the function or the item or the like, and the attributes, of which the properties or the like are representative, a unique address showing its own position is given by connecting the type and the attributes in that order to the protocol name and domain name functions which serve as an example of the identification information.

The transmitting and receiving means transmits and receives information expressed in external languages described in an XML format language or the like, to and from other devices via the network. This transmitting and receiving is generally carried out in accordance with a protocol. In addition, the transmitting and receiving means successively processes a request for at least one processing among calling-up, writing, deletion, and partial change, with respect to an object which is stored in the storage means and whose address is designated. Processing requests to objects can thereby be successively processed.

The engine means is provided between the storage means and the transmitting and receiving means. The engine means includes a first converting means, a second converting means, and a control means. The first converting means acquires, together with a request for processing, at least one object which is in accordance with external languages which is described in an XML format language or the like, and converts the acquired object into information expressed in internal languages while preserving the hierarchical structure of the acquired object as is. Accordingly, even if an object is acquired from the exterior, it can be used in a state in which the structure of the object is preserved. Further, the second converting means converts an object, which is stored in the storage means, into external languages while preserving the hierarchical structure of the object as is. Accordingly, even if an object is outputted to the exterior, the structure of the object can be preserved. Further, the control means interprets the address of a requested object and carries out the requested processing on the object whose address is interpreted. The requested processing can thereby be carried out on the object which is given a unique address showing its own position.

In this way, in the first aspect of the present invention, it is possible to resolve an address that an object has, and to reversibly convert into information which is in accordance with external languages while preserving the hierarchical structure as is. The acquisition of an object, the acquisition of values thereof, and the acquisition of functions belonging thereto can thereby be carried out by an interface which is in accordance with the engine means. Accordingly, the engine means corresponds to functioning as a universal interface which enables resolving of a unique address and reversible conversion while preserving a hierarchical structure as is.

Effects of the Invention

As described above, in accordance with the present invention, without depending on hardware of a computer and an operating system which operates the hardware, and no matter where the object is on a network, it can be used without being conscious of the differences thereof. Therefore, there is the effect that the load on the construction and employment of the network application can be reduced.

Further, in accordance with the present invention, for an object which is in accordance with a unique address, it is possible to resolve the address and to reversibly convert into information which is in accordance with external languages while preserving the hierarchical structure as is. Therefore, an object can be used as needed without the need to grasp or define the method for handling the object in advance.

BRIEF DESCRIPTION OF THE DRAWINGS

FIG. 5 An image diagram showing an example of a structure of contents.

FIG. 6 An image diagram showing partial contents in the contents.

BEST MODE FOR IMPLEMENTING THE INVENTION

Hereinafter, an example of an embodiment of the present invention will be described in detail with reference to the drawings. In the present embodiment, as an example of a network application system, an online game is used as a network application. The present invention is applied to a case in which transmission and reception of information is carried out on a network in a system structured from a user side, which uses the online game, and an employer side, which employs the online game.

Figure 2:
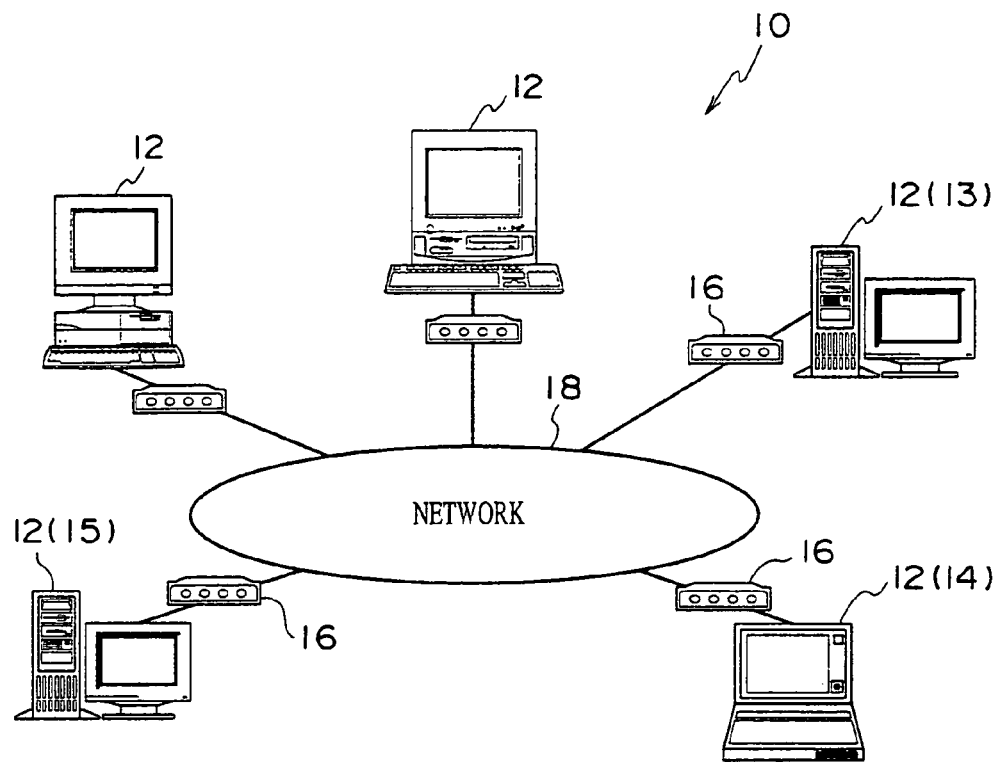
FIG. 2 A schematic structural diagram of the network system relating to the embodiment of the present invention.

The schematic structure of a network system to which the present invention can be applied is shown in FIG. 2. As shown in FIG. 2, at a network system 10, a plurality of computers 12, which can respectively be operated by the same or different operators, are connected to a network (e.g., the internet) 18 via connecting devices 16 such as modems, routers, terminal adapters, or the like, respectively. The plurality of computers 12 are structured such that transmission and reception of information is possible by mutual communication via the network 18.

Further, in the following description, as shown in FIG. 2, explanation will be given by using, as an example, a structure in which at least one computer 12 among the plurality of computers 12 functions as a computer (hereinafter called "first server computer") 13 which provides various types of information for employing the online game, and at least one computer 14 among the computers 12 functions as a computer (hereinafter called "user computer") 14 utilizing the online game at a user side. Note that there are cases in which at least one computer 12 among the plurality of computers 12 executes or takes over some of the functions of another server computer (details will be described later), and functions as a computer (hereinafter called "second server computer") 15 which executes these functions.

Note that explanation will be given with the first server computer 13, the user computer 14, and the second server computer 15 each being one computer. The present invention is not limited to this, and the first server computer 13, the user computer 14, and the second server computer 15 may each be a plurality of computers. Further, in the present embodiment, explanation will be given of a case in which reception and transmission of information is executed between the server computer and the client computer. Note that the reception and transmission of information is not limited to between the server computer and the client computer, and includes transmission and reception of information between the computers and within the computers.

The above-described network 18 corresponds to the network of the present invention. This network includes a network such as the internet or an intranet or the like, and it suffices to be structured so as to be able to connect a plurality of devices either wirelessly or by wires. The network includes, for example, a structure in which a plurality of local area networks are connected by telephone lines or radio communication lines. Further, a repeater station for connection with telephone lines or radio communication lines may be provided in a network, such that terminals, which are connected to the telephone lines or the radio communication lines, can be connected to the network via this repeater station. Further, the computer 12 can use a compact portable terminal such as a portable telephone or a PDA or the like.

In the present embodiment, a case in which the internet is applied as the network is described. Note that, in the present embodiment, although details thereof will be described later, a URI (Uniform Resource Identifier) is designated and information is transmitted and received by a protocol such as TCP/IP or the like, rather than data merely being transmitted and received as is in its original state. On the other hand, as is commonly known, there are applications in which one computer is made to function as a WWW (World Wide Web) server, and other computers are made to function as WWW clients. This application is structured such that the server computer can be arbitrarily accessed via the network. In this application, for the access position (the data structured by the position of the server computer which is the access destination, and the position of the information within the server computer), a URI is designated and data is transmitted and received as is in its original state.

In the present embodiment, when there is an access request from the user computer 14, the first server computer 13 transmits data or the like, which is at a position designated by a label by a URI, while preserving the structure thereof as is, via the network 18 to the user computer 14 which is the access source. A protocol such as HTTP (Hyper Text Transfer Protocol) or the like can be used for this transmission and reception. Note that an IP (Internet Protocol) address or a domain name can be used to identify the computer 12.

Figure 3:
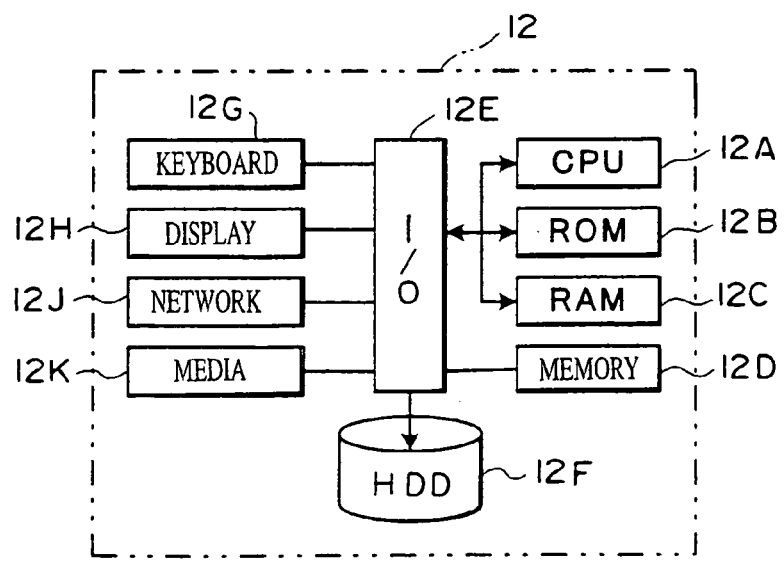
FIG. 3 A block diagram showing the basic structure of the computer.

As shown in FIG. 3, the computer 12 is structured such that a CPU 12A, a ROM 12B, and a RAM 12C are connected via an input/output interface 12E so as to be able to transmit and receive data and commands. A secondary memory 12D, such as a flash memory or the like, and a large-capacity storage device 12F, such as a hard disk drive or the like, are connected to the input/output interface 12E. Further, an input device 12G, such as a keyboard, a mouse, and the like, is provided at the computer 12 in order to input instructions at that computer, and a display 12H is provided at the computer 12 in order to display the results of processing by the computer and the like. Moreover, a network connecting device 12J, which is for connecting to the network 18, and a media device 12K, which is for reading from and writing to storage media such as flexible disks or optical disks or the like, are connected to the computer 12. Note that, because the computer 12 is a general hardware structure used for various purposes, detailed description thereof is omitted. The devices which can be incorporated into and the devices which can be connected to the computer 12 as well are general hardware structures used for various purposes, and therefore, the structures and detailed description thereof are omitted.

Figure 1:
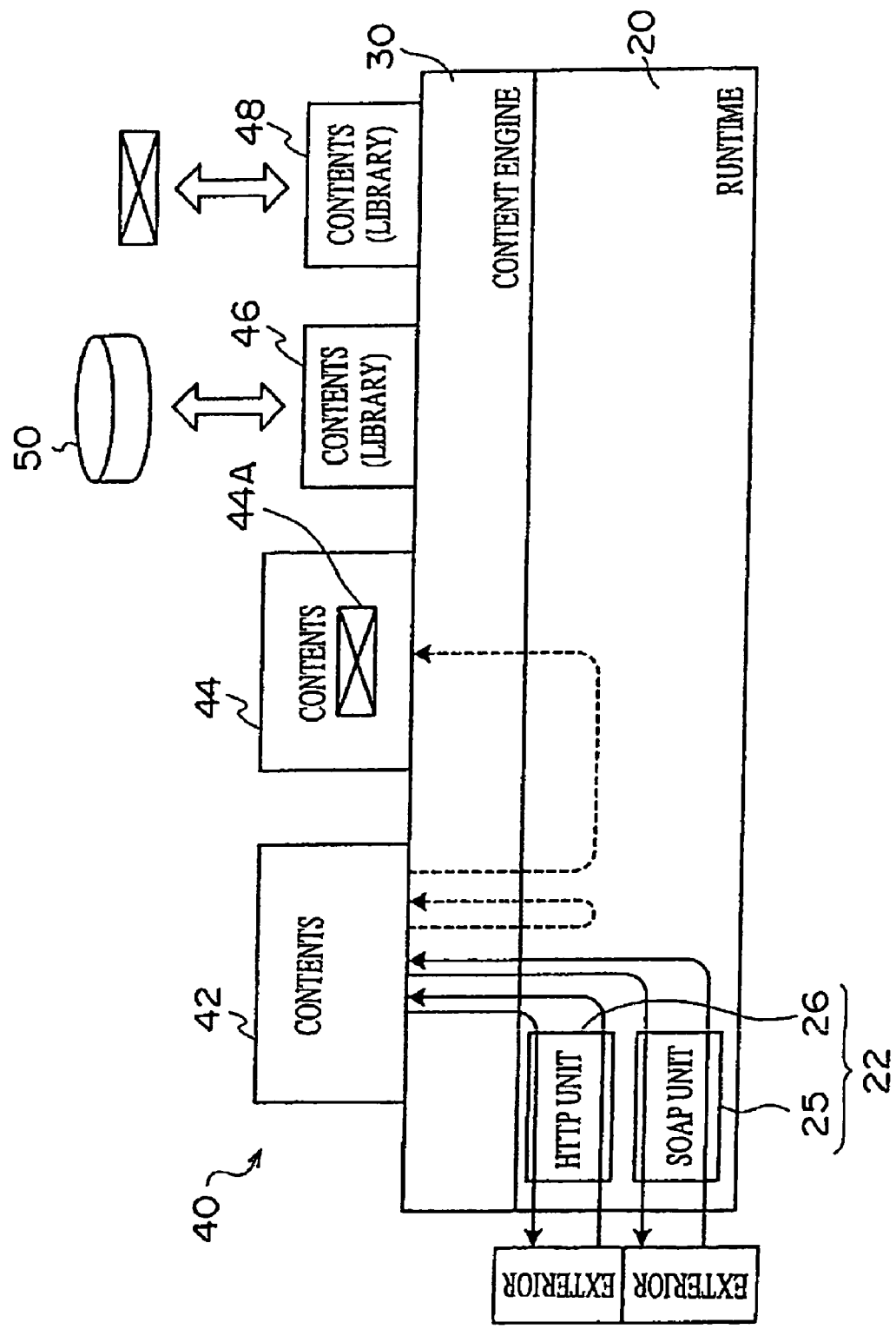
FIG. 1 A functional block diagram at a time of operating a computer of a network system relating to an embodiment of the present invention, by using hardware resources and software resources.

FIG. 1 shows a functional block diagram at the time when the computer 12 in accordance with the above-described structure operates by using hardware resources and software resources. FIG. 1 shows an example of the structure of the first server computer 13. The architecture of the first server computer 13 is structured by a runtime section 20, a content engine section 30, and a content section 40.

The runtime section 20 is mainly a functional section which carries out the transmission and reception of information to and from other computers, and various types of processings with respect to the hardware resources of the first server computer 13. As seen from the content engine section 30, the runtime section 20 is a so-called layer for hiding the OS and the communication functions and the like and for canceling environmental dependence including machine dependence. In the same way as the unit 112 of the conventional technique, the runtime section 20 includes a communication unit 22 for realizing protocol (e.g., HTTP) functions for communication with the exterior. The runtime section 20 is structured such that transmission and reception of data in accordance with a protocol determined by the communication unit 22 are possible to and from exterior devices.

A case, in which a SOAP unit 25 and an HTTP unit 26 are provided as the communication unit 22 which the runtime section 20 has, is illustrated in the example of FIG. 1. Note that the communication protocols are not limited to HTTP and SOAP. Further, the content engine section 30 transmits and receives serialized messages to and from the communication unit 22. Because the difference in the protocols used by the communication unit 22 is canceled at the runtime section 20, the content engine section 30 is not influenced by this difference. Although details will be described later, the contents are grasped by a label described by a URI. The protocol name is described in the URI, and differences in protocols are absorbed by the URI.

In the present embodiment, the content engine section 30 is a function section which carries out principal control which makes it possible to uniquely prescribe the object (the contents which will be described later). In detail, the content engine section 30 carries out hierarchical structure management by nodes which structure the object (contents). The content section 40 is a storage section which stores at least one contents controlled by the content engine section 30. In the example of FIG. 1, the content section 40 has contents 42 formed from one or a plurality of nodes which structure an application, contents 44 which contain a file 44A, contents 46 which function as a library which accesses a database 50, and contents 48 which function as a library which accesses files stored in the first server computer 13.

Here, the object means an aggregate which includes respective data nodes, and application nodes which are executing bodies, and node groups formed by combinations thereof, and in the following explanation, is collectively called contents. The contents can have a hierarchical structure which can be expressed by a tree structure by nodes. Namely, contents is a collective name for modules formed from one or plural nodes structuring an application, and resources which the application uses such as libraries, databases, files, text data (multimedia data) or the like, and the like.

Figure 7:
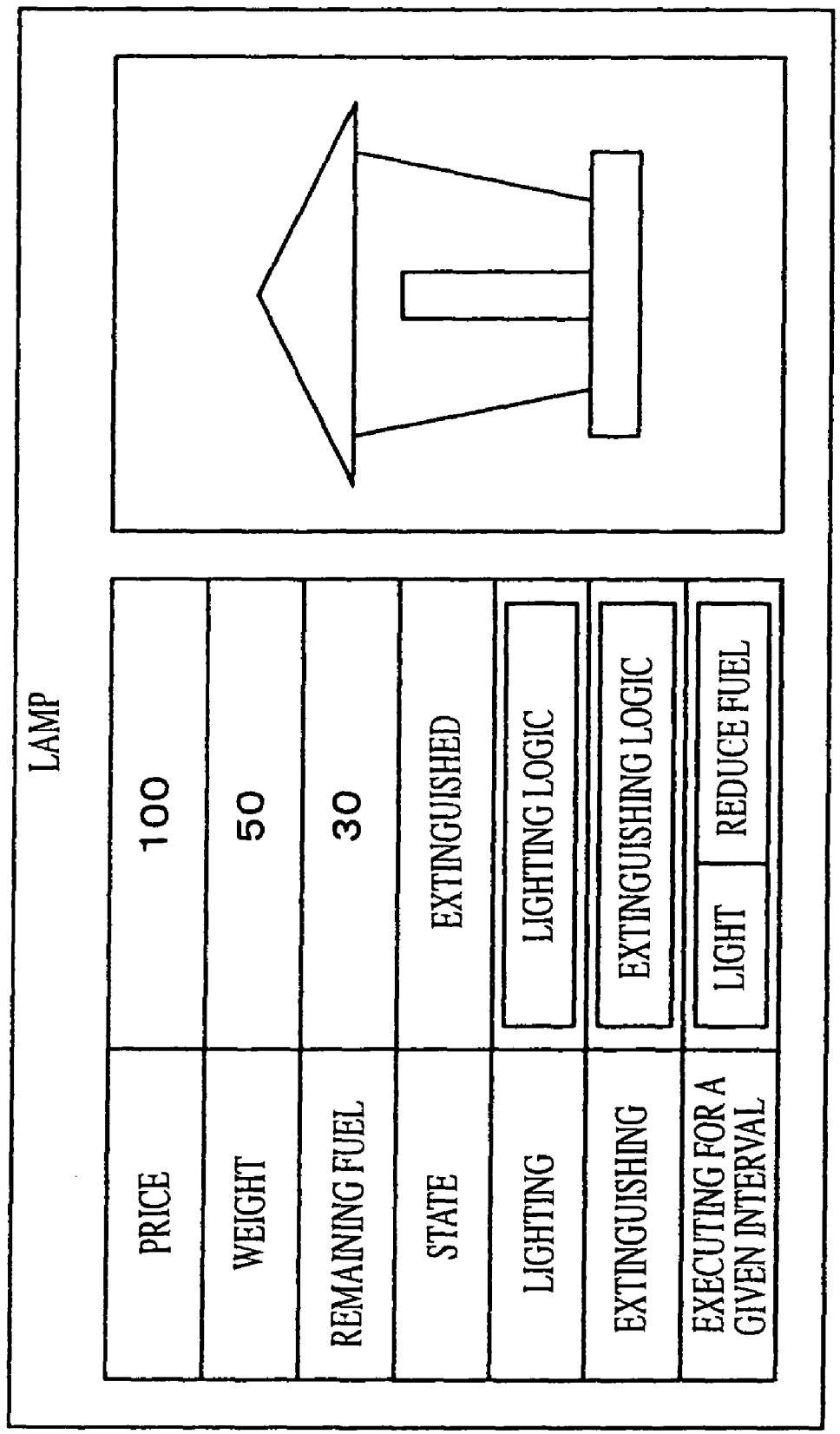
FIG. 7 An image diagram showing an example of a definition of a lamp, as an example of contents which can be used in an application.

A case of using a lamp in an application will be described as an example of the above-described contents 44. First, an example for defining the lamp within the application is shown in FIG. 7. The lamp has a selling price (100), a weight (50), and remaining fuel (30) as initial values. Three types, which are lit, extinguished, and executed for a given interval, are prescribed as the values of states which express the state of the lamp. The current state of the lamp is extinguished. Lighting is the indication of the application (lighting logic) which is used at the time of lighting the lamp. Extinguishing is the indication of the application (extinguishing logic) which is used at the time of extinguishing the lamp. Executing for a given interval is the indication of the application (lighting/fuel reducing logic) which determines the fuel which is reduced accompanying the lighting of the lamp. Note that an image (the left side) for showing the user these definitions, and an image (the right side) of the lamp itself which is displayed in the application, are shown in FIG. 7.

When the lamp is used as the above-described contents 44, the nodes which specify the lamp are needed. A structural example for realizing the lamp as contents in the present embodiment is shown in FIG. 5. The contents expressing the lamp are expressed by a tree structure by nodes. The base point of the tree structure is the storage position. The base point is given by the name of the protocol for transmitting and receiving the contents, and the name of the domain (or the storage position) showing the computer or the position on the computer where the contents are stored (located). In the present embodiment, a URI (Uniform Resource Identifier) is used as a label in order to identify the contents. For example, HTTP protocol is used as the communication protocol, and the domain name showing the server where the contents are located is "http://game_A" in the case of "game_A". Because the lamp contents are set so as to belong thereto, "/" is given to the base point. Namely, when considering only the lamp contents, the base point is expressed as "/". Due to the protocol name and the domain name (and, if necessary, the storage position) being given before the "/" which is the base point, the lamp contents can be expressed by a unique address.

Namely, in the contents 42 in accordance with the tree structure under the management of the content engine section 30, as the label in accordance with URI, "protocol name://domain name" is the base point. The tree structure of the contents 42 is expressed in continuation from this base point.

In the example of FIG. 5, in the case in which there is a lamp as an article used in the application, nodes, which are for classifying a portion defining the article which can be used and a portion designating the user, belong as categories to the lower order nodes of the base point ("/"). Namely, the items and user nodes belong in parallel to the lower order of the base point. The items node expresses the parent node of the article belonging to the lower order, and in the example of FIG. 5, the lamp node belongs to the lower order. As shown in FIG. 6, in the lamp node, nodes expressing the various state values and logics belong in parallel to the lower order. Further, the user node is a parent node with respect to the various data of the user who owns or can use the aforementioned item node. In the example of FIG. 5, respective nodes belong to the lower order of the user node, in the order of taro node, lamp node, and fuel node. Accordingly, in the example of FIG. 5, it is shown that the user "taro" has a "lamp" as an article, and the remaining amount is "25". This "lamp" has logics in lighting and extinguishing, and further, at the time of being lit, has a logic by which the fuel gradually decreases.

When listing the respective nodes while preserving the tree structure, the nodes are set so as to be continuous by a predetermined symbol such as "/" or the like. Namely, the predetermined symbol such as "/" or the like clarifies that the nodes directly before and directly after are in a parent/child relationship. In other words, all of the nodes are expressed by a unique address by path expression from the node of the base point. For each of the nodes, in a case in which the node has a value, the node has a data writing region which stores that value.

Figure 4:
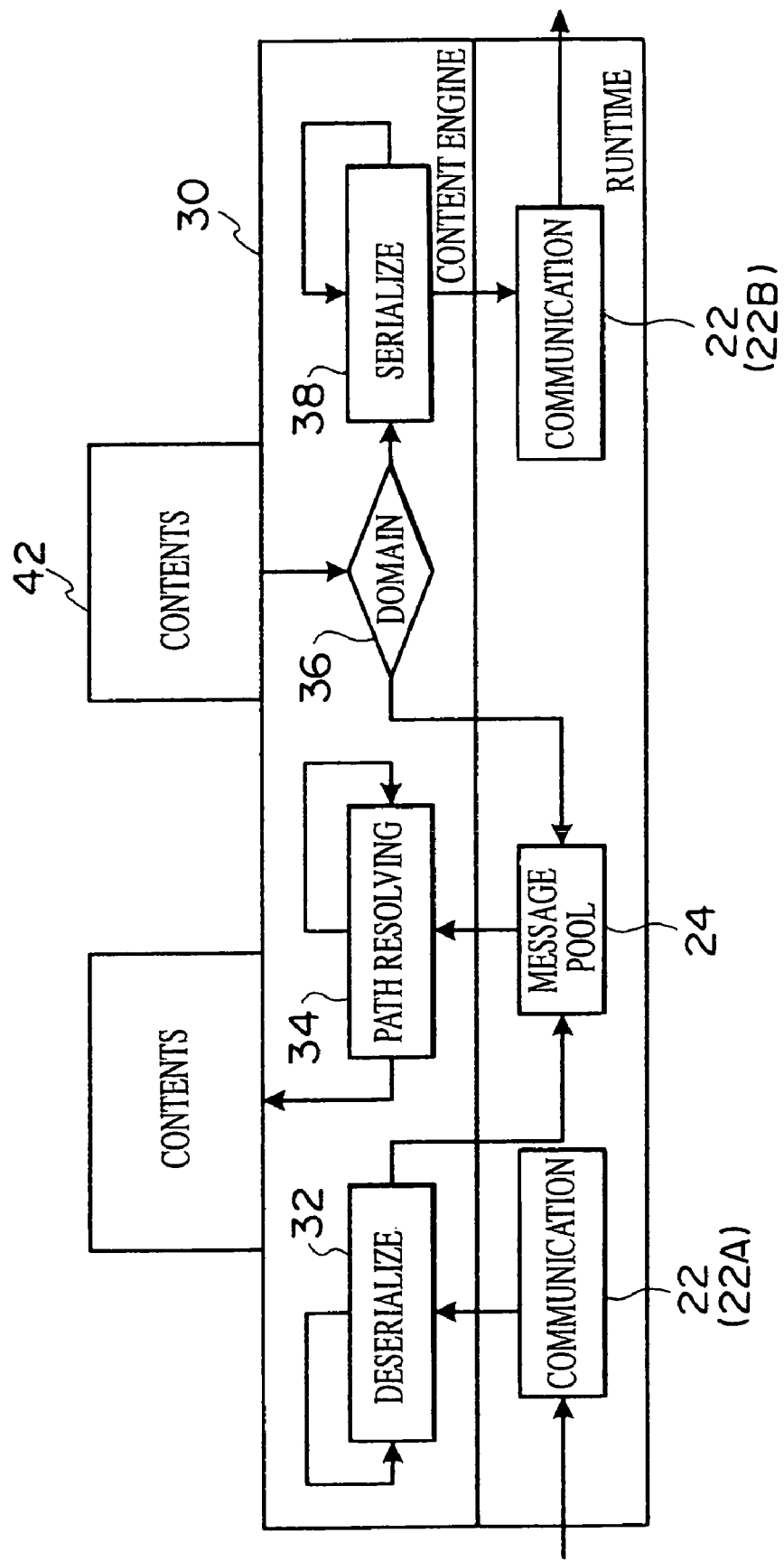
FIG. 4 A functional block diagram of the computer relating to the embodiment of the present invention.

Next, the principal structures of the runtime section 20 and the content engine section 30, and an example of operation with respect to the content section 40, will be described with reference to FIG. 4.

The runtime section 20 has the communication unit 22 which transmits and receives information from the other computers 12 (in FIG. 4, the receiving side is noted as a communication unit 22A, and the side outputting information to the other computers 12 is noted as communication unit 22B), and a message pool 24 which receives messages and stores and successively outputs (requests) them. The content engine section 30 has a deserializing section 32, a path resolving section 34, a domain determining section 36, and a serializing section 38. The deserializing section 32 is a function section which receives information (e.g., structured data described in XML format) of contents from the communication unit 22, and translates the various information, while maintaining the structure of the contents as is, into internal information, and outputs it to the message pool 24. The path resolving section 34 is a function section which receives a message from the message pool 24, grasps the address of the contents to which the message is addressed, and carries out the requested processing on the contents of that address. The serializing section 38 is a function section which translates a message, such as a request of contents which are internal information, or the like into information (e.g., structured data described in XML format) with the structure of the contents thereof preserved as is. The domain determining section 36 is a function section which determines whether the message of the request from the contents is with respect to its own computer interior (internal contents), or with respect to an external computer. This determination can be achieved by distinguishing whether or not the domain name of the URI is that of its own computer.

Accordingly, when the contents 42, which are formed from a plurality of nodes structuring the application, call up a node which is data or a logic or the like, first, the domain determining section 36 determines whether or not it is a request message with respect to internal contents, and when it is a request message with respect to internal contents, outputs a message to the message pool 24 and waits for processing thereof. On the other hand, when it is a request with respect to an external computer, that request message is described in XML format at the serializing section 38, and is outputted from the communication unit 22 toward the unique address showing the function of the request. Thereafter, the contents are received from the exterior. In this case, a message in XML format is received by the communication unit 22, and at the deserializing section 32, is translated into internal information and is stored in the message pool 24. Then, the path in accordance with the unique address is resolved by the path resolving section 34, and the contents are stored.

Namely, in the present embodiment, by the contents in accordance with the unique address labeled by the URI, it is possible to resolve a path which is in accordance with the address, and to reversibly convert into an XML document while preserving the tree structure as is. This reversible conversion is serializing conversion by the serializing section 38, and deserializing conversion by the deserializing section 32. In this way, the acquisition of the contents and the acquisition of the values thereof, and the acquisition of the belonging functions, are carried out by the same interface by the content engine section 30. Accordingly, the content engine section 30 functions as an universal interface which enables, for the contents, resolving of a unique address labeled by a URI, and reversible conversion into an XML document while preserving the tree structure as is.

Further, in the present embodiment, the message pool 24 is provided, and the processing requests to the contents can be successively processed. Therefore, a non-synchronous message can be realized.

Next, the processings of the runtime section 20 and the content engine section 30 will respectively be described individually. The flow of processings of the runtime section 20 are shown in FIG. 8, and the flow of processings of the content engine section 30 are shown in FIG. 9.

Figure 8:
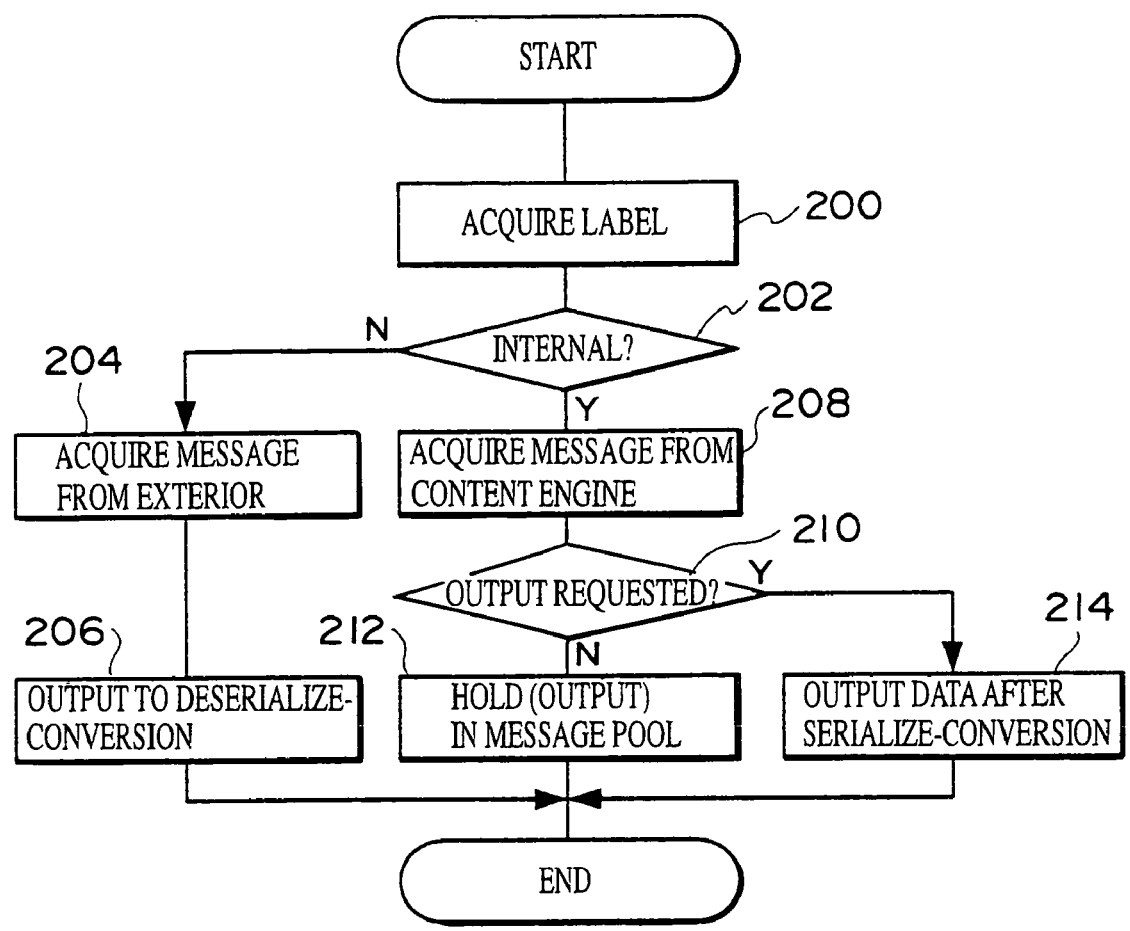
FIG. 8 A flowchart showing the flow of processings of a runtime section in a server computer relating to the present embodiment.

At the runtime section 20, in step 200 of FIG. 8, a label from the interior or exterior is acquired. This label is described by a URI. From the protocol name and the domain name, it is distinguished whether it is a request from the interior or a request from the exterior. In next step 202, it is determined whether or not it is a request from the interior. If the determination in step 202 is negative, in step 204, the runtime section 20 acquires a message from the exterior. This acquisition corresponds to reception of the communication unit 22. In next step 206, the acquired message is outputted to the deserializing section 32. On the other hand, if the determination in step 202 is affirmative, the routine proceeds to step 208, and the runtime section 20 acquires the message from the content engine section 30. This acquisition is the runtime section 20 receiving the message from the deserializing section 32 and the domain determining section 36, or is the runtime section 20 receiving the message from the serializing section 38. In next step 210, it is determined whether or not the message is an output request to the exterior. This determination is a determination as to whether or not it corresponds to output from the serializing section 38. If the determination in step 210 is affirmative, the routine proceeds to step 214, and the message is outputted by the communication unit 22. On the other hand, if the determination in step 210 is negative, in step 212, the message is stored in the message pool 24 and processed. This processing is processing of outputting in accordance with a request.

Figure 9:
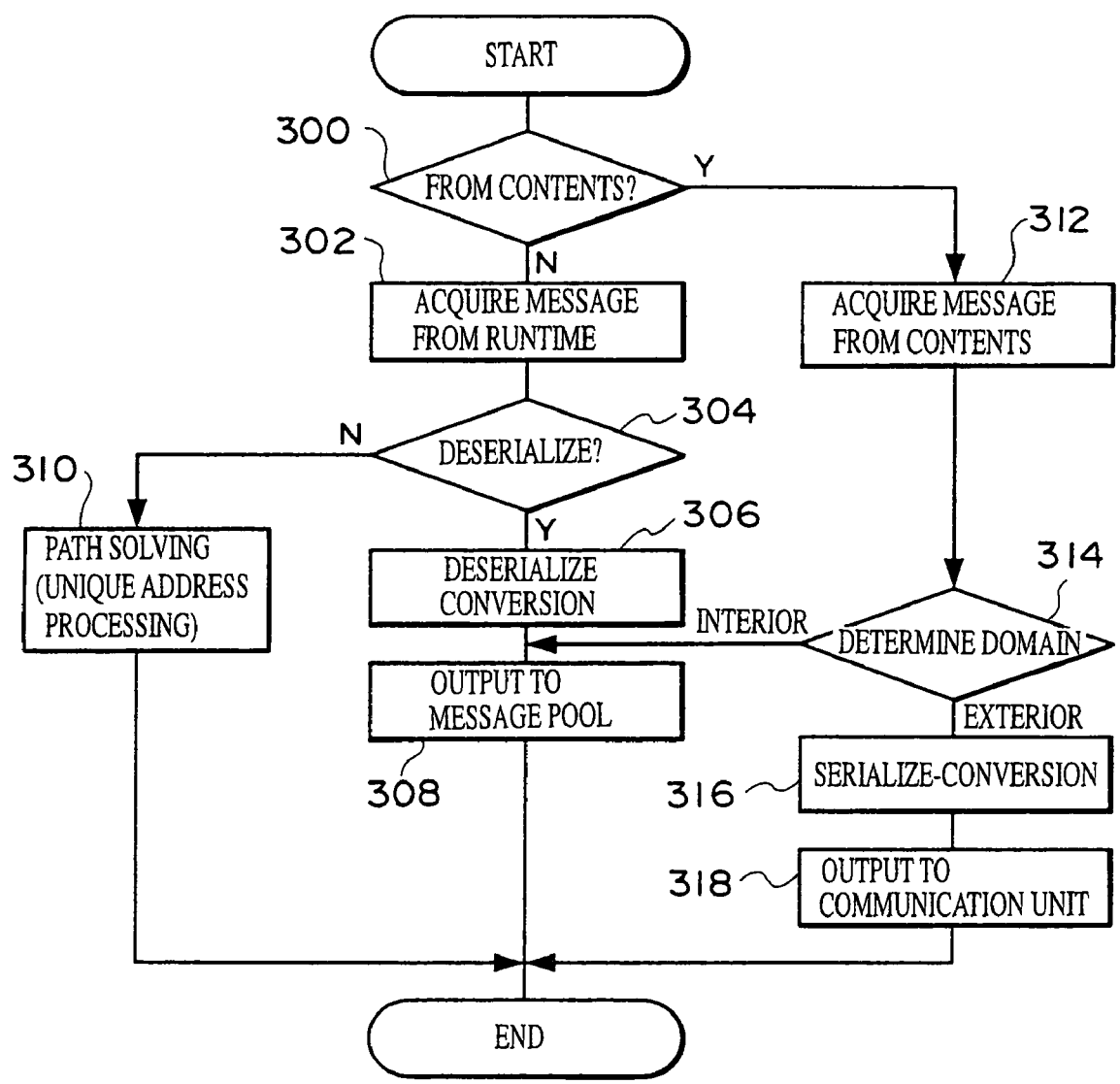
FIG. 9 A flowchart showing the flow of processings of a content engine section in the server computer relating to the present embodiment.

At the content engine section 30, in step 300 of FIG. 9, the URI is read and it is determined whether or not it is from the contents. If the determination in step 300 is negative, in step 302, a message from the runtime section 20 is acquired, and in next step 304, it is determined whether or not it requests deserializing. If the determination in step 304 is negative, the routine proceeds to step 310, and unique address processing is executed (for example, FIG. 10). On the other hand, if the determination in step 304 is affirmative, in step 306, a message in XML format or the like is deserialize-converted into internal information by the deserializing section 32, and, in step next 308, is outputted to the message pool 24.

On the other hand, if the determination in step 300 is affirmative, the routine proceeds to step 312, and the message is acquired from the contents. In next step 314, it is determined, from the domain name, whether the address requested by the message is external or internal. If it is for the interior, the routine proceeds to step 308, and it is outputted to the message pool 24. On the other hand, if it is exterior, in step 316, serializing-conversion is carried out by the serializing section 38, and the information (XML format) of the results of conversion is outputted to the communication unit 22 in next step 318.

Figure 10:
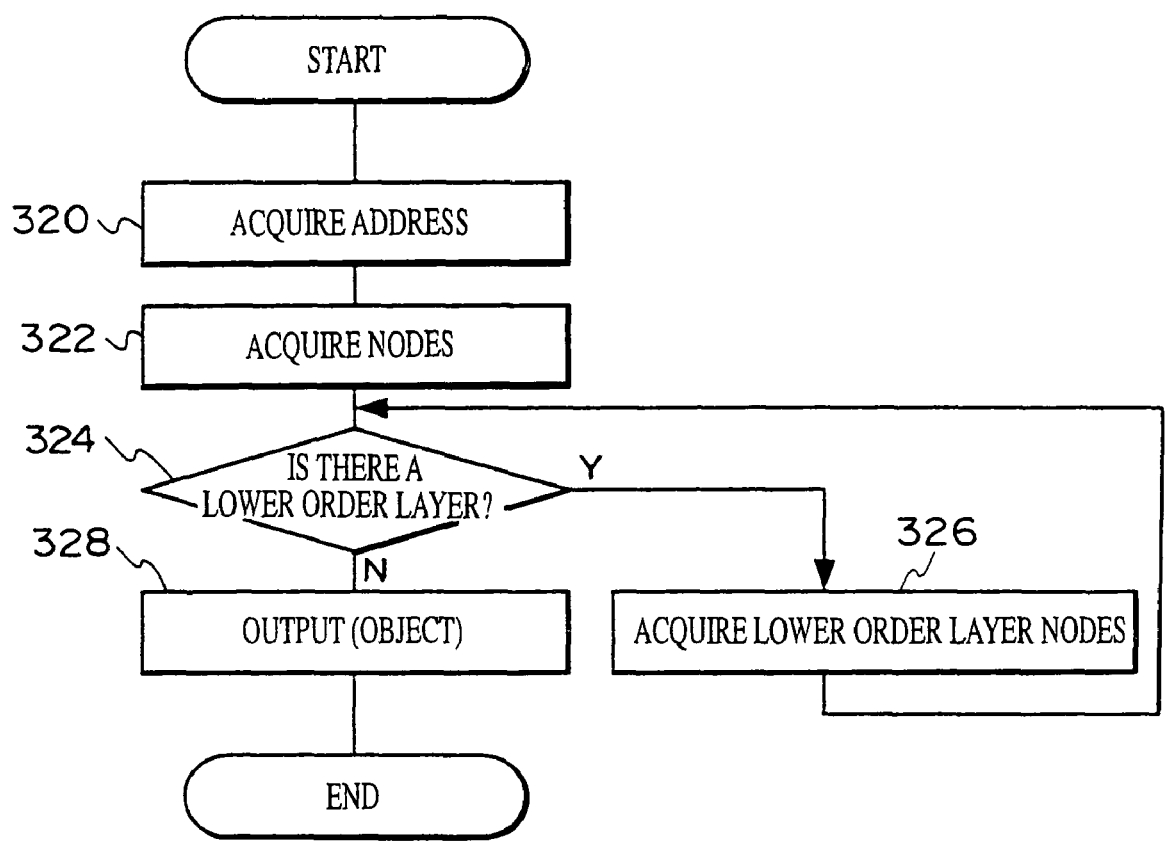
FIG. 10 A flowchart showing an example of unique address processing of contents in a path resolving section which functions at the content engine section in the server computer relating to the present embodiment.

An example of the processing of interpreting the unique address of the contents and acquiring the contents, i.e., an example of the processing of the path resolving section 34, is shown in FIG. 10.

In step 320 of FIG. 10, the address is acquired, and in next step 322, the nodes are acquired. In the processing of acquiring the nodes, the nodes are acquired on the basis of the domain name and the stored position in accordance with the aforementioned URI. In next step 324, it is determined whether or not there is a lower order layer in the acquired address. In this determination, as described above, it is distinguished whether or not there exists an identifier which is sectioned by "/". If the determination in step 324 is affirmative, in next step 326, the lower order layer node is acquired. Steps 324 and 326 are repeated until the lower order layer nodes are acquired for all of the nodes (the determination in step 324 is negative). When the determination in step 324 is negative, the routine proceeds to step 328, and the contents are outputted.

Figure 13:
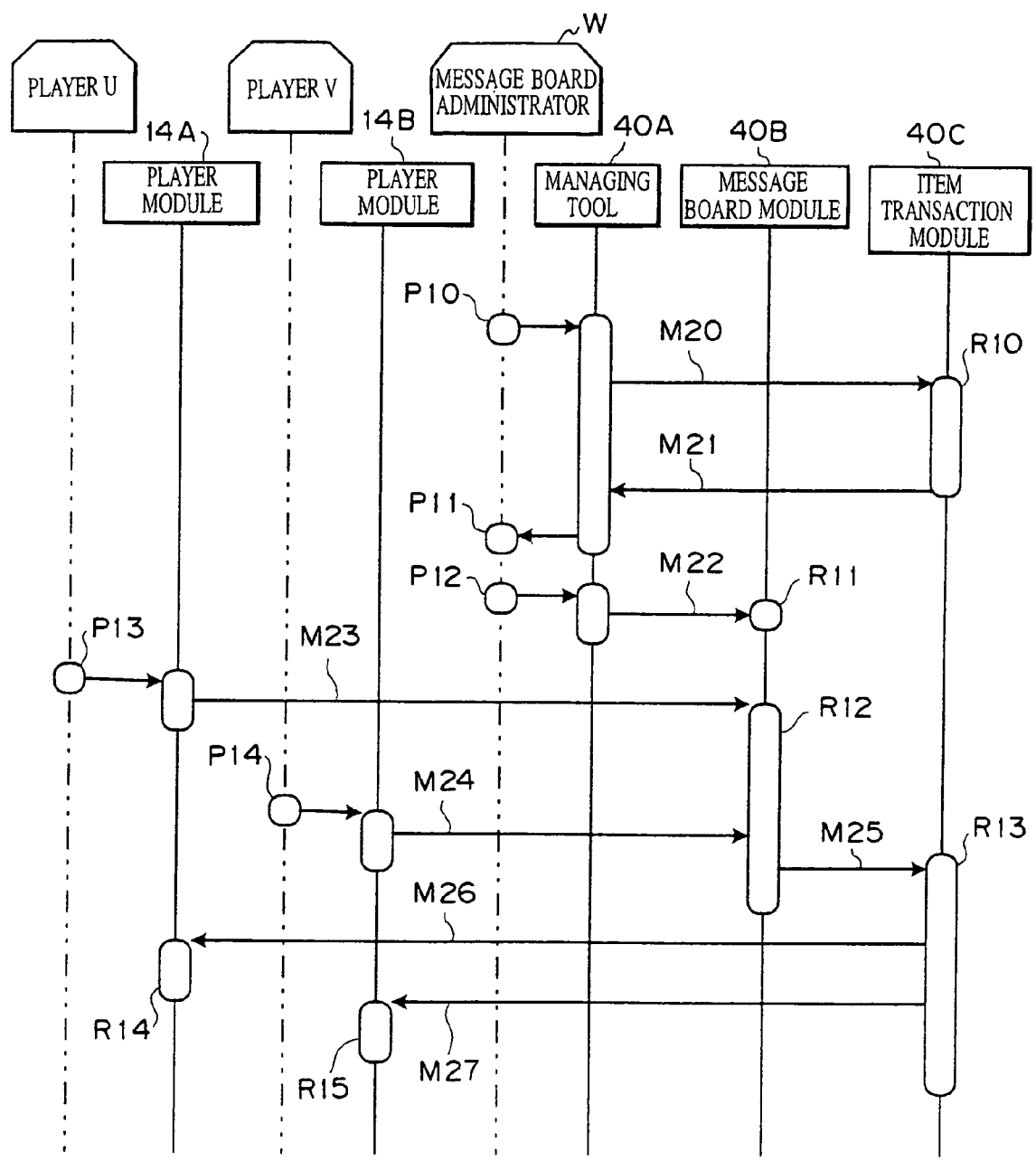
FIG. 13 An image diagram showing transmission and reception of information between computers, for explaining the construction of a related service in the network system relating to the embodiment of the present invention.

Next, with reference to FIG. 13, the construction of a related service which can be achieved by utilizing the contents in accordance with the above-described structure, will be described. Here, explanation will be given of a case in which, as the related service, transactions of items used in an online game are carried out by using a message board. What is called an item here is a character within application game_A, or equipment or a utensil or the like in the online game which can be used by the character.

At the first server computer 13, the application game_A which is an online game is operated. The first server computer 13 is structured so as to include contents of item transactions (an item transaction module 40C) for carrying out transactions of items of the application game_A which is the online game. Further, the second server computer 15 is structured so as to include contents (a message board module 40B) for executing applications of the message board relating to the carrying out of transactions of items. The applications of the message board are operated at the second server computer 15. The application (contents) which manages the administration of the message board at the second server computer 15 is called a managing tool 40A for convenience in the following description. The application (contents) for executing the processings of the message board is called a message board module 40B. Further, the application (contents) executing the item transaction processing at the first server computer 13 is called an item transaction processing module 40C. Moreover, in the following explanation, description will be given with the content engine section omitted.

Further, in this explanation, a user who desires to sell an item operates a user computer as player U. A user who desires to buy an item operates a user computer as player V. The manager, who manages the administration of the message board, carries out buying and selling processing of items as message board administrator W. Note that the application (contents) executing the item buying and selling processing via the message board, which is the application which is operated on the user computer 14 which the player U operates, is called player module 14A. The application (contents) executing the item buying and selling processing via the message board, which is the application which is operated on the user computer 14 which the player V operates, is called player module 14B. Further, in the following description, explanation is given of a case in which the administrator of the message board adds item transaction services to the message board by using item transaction contents.

First, the message board administrator W issues instructions by operation of a keyboard or the like (instruction input P10), for item transaction method inquiry. The managing tool 40A thereby accesses the item transaction processing module 40C, and outputs a message M20 instructing "acquire contents of item transaction". The access from the managing tool 40A to the item transaction processing module 40C is carried out via the above-described universal interface (the content engine section 30), and therefore does not depend on the inherent languages thereof. Next, the item transaction processing module 40C acquires (process R10) the following three transaction information as information relating to the item transaction contents, and replies (message M21). The first transaction information is information describing the investigating method of the item which is being handled. The second transaction information is information describing the investigating method of the price of the item. The third transaction information is information describing the method of purchasing the item. The managing tool 40A receives this reply, and by displaying it on a display or the like, presents the results of the inquiry to the message board administrator W (instruction output P11). On the basis of the results of inquiry, the message board administrator W gives instructions by operation of a keyboard or the like (instruction input P12). The managing tool 40A thereby outputs to the message board module 40B a message M22 instructing "add item transaction service". Item transaction service addition processing is thereby executed at the message board module 40B (process R11).

Next, the player U carries out operation by a keyboard or the like (instruction input P13). In this way, the player module 14A transmits, to the message board module 40B of the second server computer 15, a message M23 that there is the "desire to sell an item" which can be used in the application game_A. Namely, this transmission is processing for writing, to the message board which is operating, information of the desire to sell an item. When the player V refers to the message board and desires acquisition, the player V carries out operation of a keyboard or the like (instruction input P14). The player module 14B thereby transmits, to the message board module 40B, a message M24 that there is the "desire to purchase an item". Namely, this transmission is processing for writing, to the message board, information of the desire to buy an item.

The message board module 40B monitors writings of both sellers and buyers, i.e., monitors the establishment of item transactions (process R12), and when a transaction is established, transmits message M25 stating "item transaction established" to the item transaction processing module 40C. This transmitted information includes a message that the player U has sold an item and the player V has bought it. Further, the buying and selling value may be added to this message.

The item transaction processing module 40C transmits to the player module 14A a message M26 to "increase the funds of the player U in accordance with the selling value, and delete the sold item from the owned item list". Further, the item transaction processing module 40C transmits to the player module 14B a message M27 to "reduce the funds of the player V in accordance with the purchase value, and add the item to the owned item list". Here, when management of the items is carried out at the item transaction processing module 40C, the item transaction processing module 40C increases the funds of the player U in accordance with the selling value and deletes the sold item from the owned item list, and reduces the funds of the player V in accordance with the purchase value and adds the item to the owned item list (process R13). Further, when carried out at the respective player modules, the player module 14A increases the funds of the player U in accordance with the selling value and deletes the sold item from the owned item list (process R14), and decreases the funds of the player V in accordance with the purchase value and adds the item to the owned item list (process R15). Note that, when item management is carried out at another device, it suffices to transmit these information to the device.

In this way, a unique address is given to the contents, and the objects thereof can easily be reached. Accordingly, the service provider (the message board in the present embodiment) can freely utilize the contents. Namely, when the service provider adds an item transaction service to the message board as described above, it suffices to merely acquire the address of the item transaction contents within the online game application, and register it at the server which is operating the message board service. As a result, although it has conventionally been difficult to operate services associated solely by a method that a network application architect has defined, users can easily create related services by using the universal interface.

Figure 11:
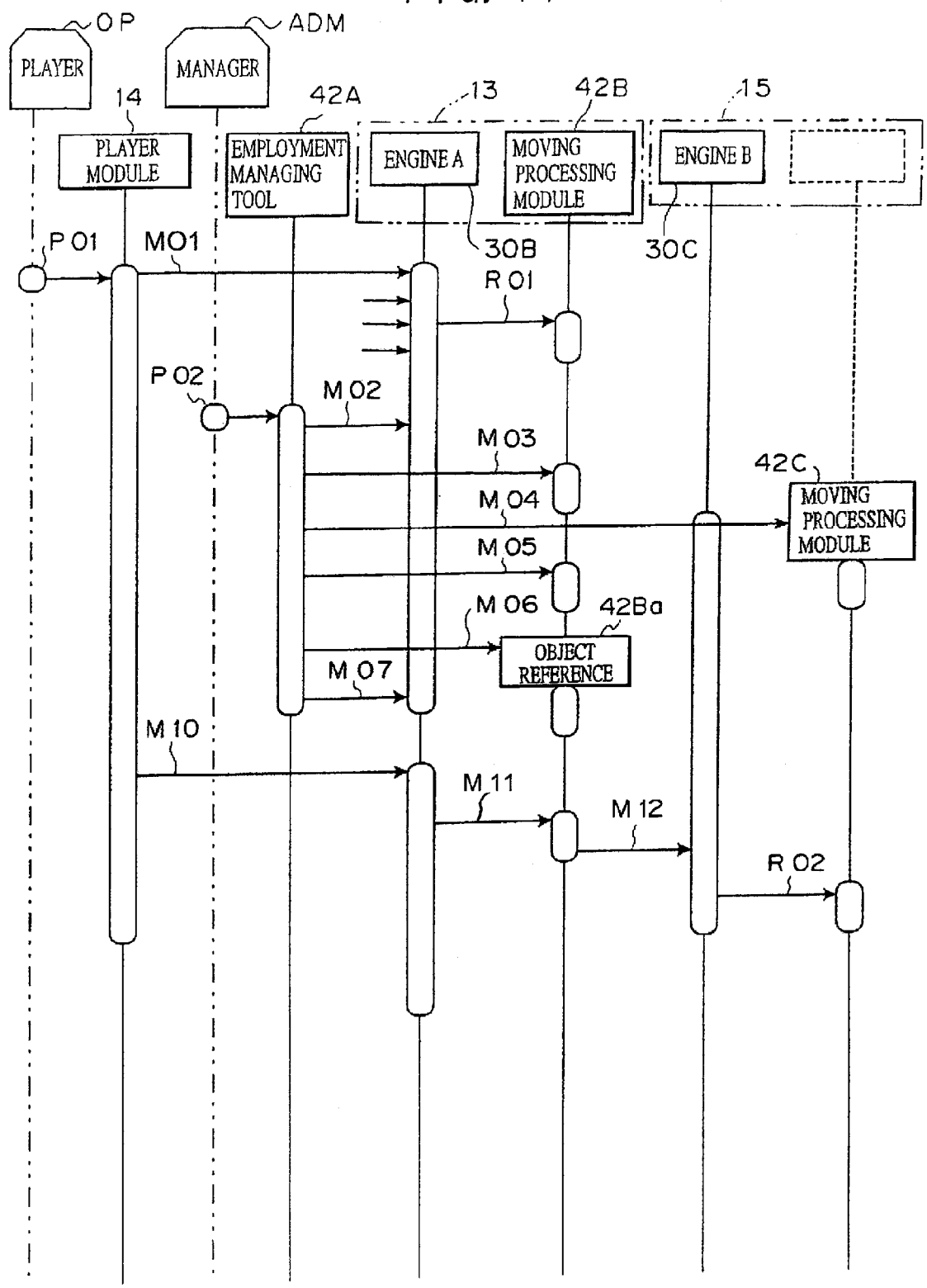
FIG. 11 An image diagram showing information transmission and reception between computers, for explaining load dispersal in the network system relating to the embodiment of the present invention.
Figure 12:
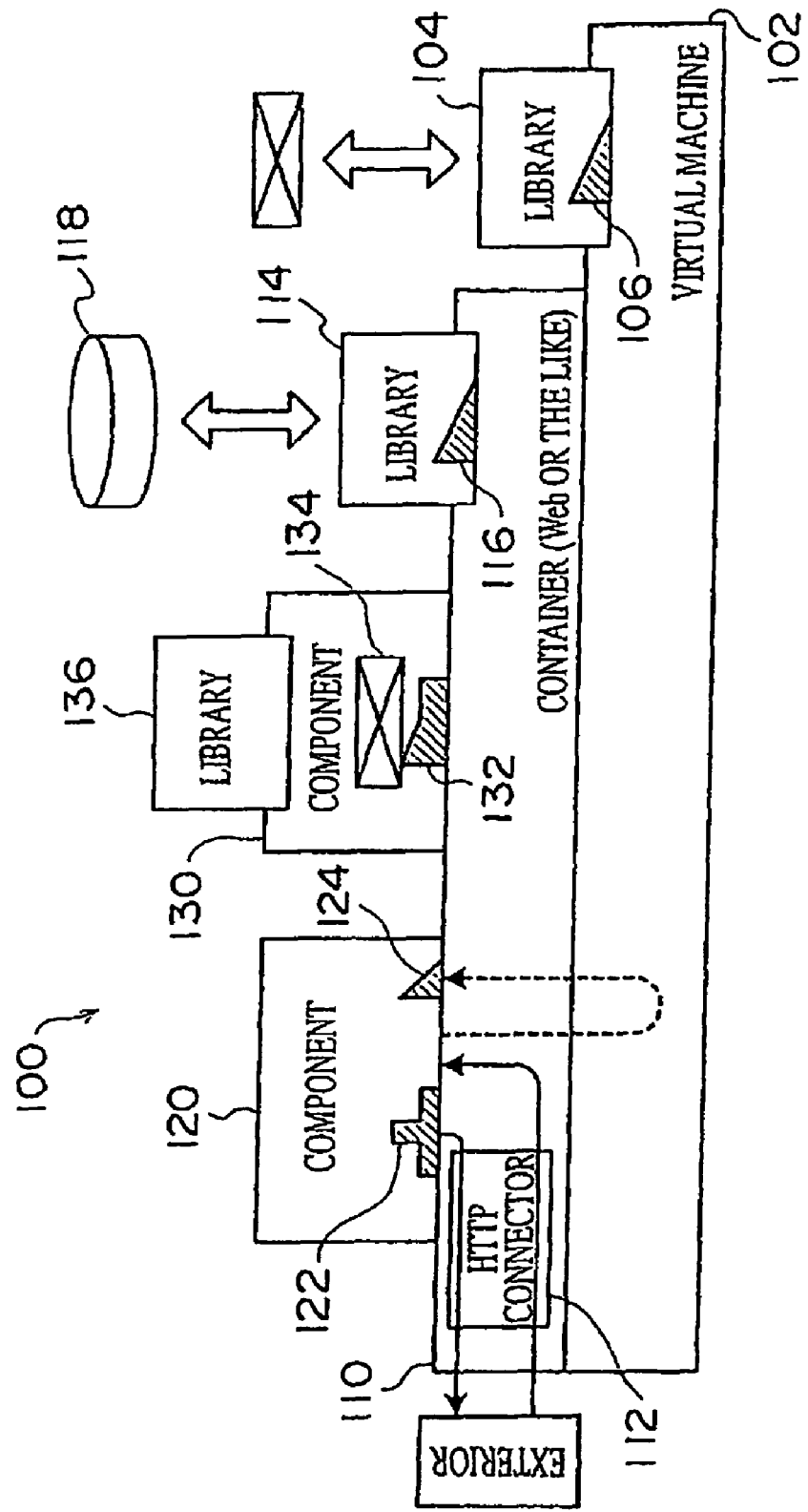
FIG. 12 A functional block diagram at a time of operating a computer of a conventional network system, by using hardware resources and software resources.

Next, with reference to FIG. 11, explanation will be given of load dispersal which can be achieved by using contents in accordance with the above-described structure. Here, explanation will be given of a case in which, when the load of the first server computer 13 increases, in order to decrease the load of the first server computer 13, the contents which are operated at the first server computer 13 are moved to the other computer 12 (the second server computer 15) and executed.

Note that a case is supposed in which the first server computer 13 operates game_A as the application on a network, and participates by accessing the application game_A from a client computer such as the user computer 14 or the like. Further, the first server computer 13 is a structure which has, as the contents, an application which manages the employment of the application game_A, and which can operate the respective contents of the application game_A by instructions of a manager ADM.

Further, in the description herein, the user who operates the user computer 14 participates in the application game_A as player OP. In the following description, as an example of load balancing, the moving processing of a character in the application game_A is described. Note that the application (contents) which manages the employment of the application game_A belonging to the first server computer 13 is called an employment managing tool 42A for convenience in the following explanation. The application (contents) which executes the moving processing of the character is called a moving processing module 42B. Further, the application (contents) which executes the moving processing of a character moved by the second server computer 15 as will be described later is called a moving processing module 42C. Further, in order to avoid confusion between the content engine sections 30 of the first server computer 13 and the second server computer 15, the first server computer 13 is called content engine section 30B, and the second server computer 14 is called content engine section 30C.

First, at the user computer 14, a player module is operated at an application (contents) of the client side. The player OP carries out operation of a keyboard or the like (instruction input P01). The player module thereby transmits to the first server computer 13 a message MO 1 stating "player P moves" within the application game_A. In this transmission, the address of the moving processing module (contents) 42B is designated, and the unique address of the moving processing module 42B is transmitted to the first server computer 13. At the first server computer 13, the content engine section 30B acquires the message, calls-up the moving processing module 42B (e.g., the contents 42 of FIG. 1), and updates the position information of the player P which the moving processing module 42B manages (process R0l).

At this time, when messages regarding the movements of players concentrate from the other computers 12 with respect to the first server computer 13, the load of the moving processing module 42B increases. This load status is monitored by the manager ADM, and implementation of load balancing is determined. Note that the manager ADM may carry out this determination and input instructions, or the load status of the CPU may be quantified and determination automatically executed when there is a load of a predetermined value or more. Here, explanation will be given of a case in which the manager ADM inputs instructions.

By carrying out operation of a keyboard or the like (instruction input P02), the manager ADM instructs load balancing to the moving processing module 42B. The moving processing module 42B outputs, to the content engine section 30B, a message M02 instructing "maintain the state of storing, in the message pool, the messages to the contents of the object of moving". Next, in order to move the moving processing module 42B, the employment managing tool 42A outputs, to the content engine section 30B, a message M03 which is a serializing request of the moving processing module 42B. The content engine section 30B receives this, and carries out serializing of the moving processing module 42B. Next, the employment managing tool 42A outputs, to the content engine section 30B, a message M04 to transmit the serialized moving processing module 42B to the second server computer 15, and it is transmitted to the second server computer 15 from the runtime section 20.

The second server computer 15 acquires the serialized moving processing module 42B from the first server computer 13, and deserializes and stores it. At this time, the content structure of the moving processing module 42B is preserved as is. However, the unique address of the contents is given as the second server computer 15. Next, the employment managing tool 42A outputs, to the content engine section 30B, a message M05 instructing the deletion of the moved moving processing module 42B from the first server computer 13. The content engine section 30B thereby deletes the moving processing module 42B. Note that, what is called deletion here is not immediate deletion, but is deletion at the time of completion of the processings carried out continuously at the moving processing module 42B.

Here, when the moving processing module 42B is deleted from the first server computer 13, in a case in which an arbitrary computer 12 requests access to the moving processing module 42B at a unique address, the contents thereof do not exist, and the request cannot be met. Thus, after outputting the aforementioned deletion instructing message M05, the employment managing tool 42A outputs, to the content engine section 30B, a message M06 instructing the provision of contents 42Ba expressing reference. The contents 42Ba are contents expressing reference to the moving processing module 42C, at the position of the moving processing module 42B. In this way, even if the moving processing module 42B is instructed, it is easy to call-up the moving processing module 42C. Next, the employment managing tool 42A outputs, to the content engine section 30B, a message M07 instructing "cancel the state of storing messages in the message pool" for the moving processing module 42B. In this way, at the first server computer 13, the messages are successively taken-out from the message pool 24, and processing is restarted.

Thereafter, a message M10 that "the player P moves" is transmitted from the player module to the first server computer 13. In this transmission, the address of the moving processing module (contents) 42B is designated. However, at this address, there are the contents 42Ba expressing reference (M11), and therefore, the content engine section 30B transfers (M12) the message to the moving processing module 42C of the second server computer 15 which is the reference destination thereof. At the second server computer 15, the content engine section 30C acquires the message, calls-up the moving processing module 42C, and updates the position information of the player P which the moving processing module 42C manages (process R02).

In this way, in the present embodiment, a unique address is given to contents, and the object thereof can be easily reached. Further, because the contents are prescribed in a tree structure, input and output while preserving the structure of the contents as is is possible. In this way, without setting an input/output interface in advance, the contents can be used as is, and information can easily be transmitted and received among devices.

Further, in the present embodiment, by using contents, which are in accordance with the above-described structure and which are contents to which a unique address is given, the contents can move among the devices, and load balancing can be carried out without stoppage during the operating of the application. Accordingly, there is no need to create a system construction which presupposes load balancing in advance.

Further, a unique address is given to the contents, and the object thereof can easily be reached. Accordingly, for example, the service provider of the message board or the like can freely use contents which can be used in the network application. The service provider can thereby easily construct a service, which conventionally could be operated only by a method defined by the network application architect, as a related service which was not imagined at the time of constructing the network application.

Moreover, in the present embodiment, by using contents, which are in accordance with the above-described structure and to which a unique address is given, the contents can be linked to the execution environment (employment environment) of the network application. Accordingly, at the time of developing a network application or at the time of developing a related service, the role-dividing system can be promoted.

In the above-described embodiment, the example of a network such as the internet or the like is described, but the network may be either wired or wireless.

Further, in the present embodiment, explanation is given of a case in which the contents, to which the address in accordance with URI is given, are transmitted and received in HTTP protocol or the like. However, the present invention does not limit the protocol. Moreover, what is transmitted and received is not limited to information in a form described by XML format, and may be information of a form described in a standard (e.g., YAML or the like) for structured documents or the like, rather than a markup language. Further, in addition, a language format in accordance with a common standard that can be circulated among networks may be employed. Namely, an arbitrary form can be employed provided that it is a form matching the following conditions. These conditions are that it can express the hierarchical structure of the contents, the processing does not depend on the inherent language, it has affinity with the protocol, and it can express various data formats.

Moreover, in the present embodiment, description is given of a case in which information transmission and reception, e.g., the transmission and reception of messages, is carried out among any of the runtime section 20, the content engine section 30, and the content section 40. However, the present invention is not limited to information transmission and reception being directly executed among the respective sections. For example, a cache memory may be provided and a so-called cache function may be added which temporarily stores information transmission and reception and executes past information transmission and reception with respect to the same type of information transmission and reception.

Further, in the case of information transmission and reception on a network or within a device, a validation mechanism may be added, and an access restricting function or a license controlling function may added which permits or restricts the acquisition and calling-up of contents from the interior or exterior.

INDUSTRIAL APPLICABILITY

The present invention can be also be applied to the development and employment of online games which transmit and receive information via communication lines.

DESCRIPTION OF THE NUMERALS 13 first server computer
14 user computer
15 second server computer
18 network
20 runtime section
22 communication unit
24 message pool
30 content engine section
32 deserializing section
34 path resolving section
36 domain determining section
38 serializing section
40 content section
42 contents
44 contents

The invention claimed is:

1. An information processing method of an information processing device which transmits and receives information to and from other devices via a network, comprising:
   storing in a memory of the information processing device, a plurality of objects as nodes of a hierarchical tree structure, wherein:
   (i) each object is denoted as a particular sub-tree of the hierarchical tree structure, each object comprising one or more application nodes, one or more data nodes, and zero or more objects as sub-nodes,
   (ii) each sub-tree is given a unique label that represents corresponding nodes of the hierarchical tree structure, the unique label including (A) name information showing node names from a higher order node of the hierarchical tree structure to a highest order node of the sub-tree, the name information being continuous and (B) a storing position indicating a location of the sub-tree on the network;
   (iii) each application node including application logic for calling-up, writing, deleting, or partially changing one or more data nodes of the respective application node's object;
   transmitting and receiving information expressed in an external language to and from other devices via the network, receiving an HTTP request comprising: a particular label expressing a designated sub-tree, and an identification of an application node of the designated sub-tree;

acquiring, via the network, the designated sub-tree and the identified application node of the designated sub-tree from the HTTP request;

firstly translating the designated sub-tree into information expressed in an internal language, while preserving a tree structure of the designated sub-tree;

executing the application logic of the identified application node of the designated sub-tree; and secondly translating a sub-tree stored in the memory into the external language while preserving a tree structure of the stored sub-tree;

wherein the information processing method enables a user to change contents of the one or more data nodes during the execution of a program of the information processing device that access the plurality of objects.

2. The information processing method of claim 1, wherein the unique label is expressed by a URI.

3. The information processing method of claim 1, wherein the executing of the application logic comprises adding a data node to the object at the designated sub-tree.

4. A non-transitory computer-readable recording medium comprising an information processing program which, when executed by a computer which transmits and receives information to and from other devices via a network, performs the following:

storing, in a memory of an information processing device, a plurality of objects as nodes of a hierarchical tree structure, wherein:

(i) each object is denoted as a particular sub-tree of the hierarchical tree structure, each object comprising one or more application nodes, one or more data nodes, and zero or more objects as sub-nodes, (ii) each sub-tree is given a unique label that represents corresponding nodes of the hierarchical tree structure, the unique label including (A) name information showing node names from a highest order node of the hierarchical tree structure to a highest order node of the sub-tree, the name information being continuous and (B) a storing position indicating a location of the sub-tree on the network;

(iii) each application node including application logic for calling-up, writing, deleting, or partially changing one or more data nodes of the respective application node's object;

transmitting and receiving information expressed in an external language to and from other devices via the network, receiving an HTTP request comprising: a particular label expressing a designated sub-tree, and an identification of an application node of the designated sub-tree;

acquiring, via the network, the designated sub-tree and the identified application node of the designated sub-tree from the HTTP request;

firstly translating the designated sub-tree into information expressed in an internal language while preserving a tree structure of the designated sub-tree;

executing the application logic of the identified application node of the designated sub-tree;

secondly translating a sub-tree stored in the memory into the external language while preserving a tree structure of the stored sub-tree;

wherein the information processing program enables a user to change contents of the one or more data nodes during the execution of a program of the information processing device that accesses the plurality of objects.

5. The non-transitory processing method of claim 4, wherein the unique label is expressed by a URI.

6. The non-transitory computer recording medium of claim 4, wherein the executing of the application logic comprises adding a data node to the object at the designated sub-tree.

* * * * *